US011689522B2

(12) United States Patent
Kulkarni et al.

(10) Patent No.: US 11,689,522 B2
(45) Date of Patent: Jun. 27, 2023

(54) METHOD AND APPARATUS FOR SECURE HYBRID CLOUD CONNECTIVITY

(71) Applicant: VMWARE, INC., Palo Alto, CA (US)

(72) Inventors: Vaibhav Kulkarni, Pune (IN); Mukesh Hira, Palo Alto, CA (US); Akshay Katrekar, Palo Alto, CA (US); Suyash Vishwas Gogte, Pune (IN); Prem Shankar Sharma, San Jose, CA (US); Nikolay Semenov, Palo Alto, CA (US); Saqib Raza, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 287 days.

(21) Appl. No.: 17/010,052

(22) Filed: Sep. 2, 2020

(65) Prior Publication Data

US 2022/0006805 A1    Jan. 6, 2022

(30) Foreign Application Priority Data

Jul. 3, 2020  (IN) .............................. 202041028375

(51) Int. Cl.
*H04L 9/40*    (2022.01)
*G06F 9/455*   (2018.01)
*H04L 67/10*   (2022.01)
*H04L 67/53*   (2022.01)

(52) U.S. Cl.
CPC ...... *H04L 63/0823* (2013.01); *G06F 9/45558* (2013.01); *H04L 63/0236* (2013.01); *H04L 63/20* (2013.01); *H04L 67/10* (2013.01); *H04L 67/53* (2022.05); *G06F 2009/45587* (2013.01); *G06F 2009/45595* (2013.01)

(58) Field of Classification Search
None
See application file for complete search history.

(56) References Cited

U.S. PATENT DOCUMENTS

| 2016/0316025 | A1* | 10/2016 | Lloyd ..................... H04L 67/51 |
| 2018/0173561 | A1* | 6/2018 | Moroski ............... G06F 9/5088 |
| 2018/0183762 | A1* | 6/2018 | Fetvadjiev .......... G06F 21/6263 |
| 2018/0255142 | A1* | 9/2018 | Benantar ............... H04L 67/562 |

(Continued)

OTHER PUBLICATIONS

Stunnel: Securing the Insecure with SSL and Creating SSL Tunnels. Posted at <https://www.suse.com/c/stunnel-securing-insecure-ssl-and-creating-ssl-tunnels/> on Sep. 5, 2008 (Year: 2008).*

*Primary Examiner* — Scott B Christensen
(74) *Attorney, Agent, or Firm* — Loza & Loza, LLP

(57) ABSTRACT

System and computer-implemented method for secure hybrid cloud connectivity between an application in a public cloud service and an on-premises service supported by an on-premises appliance includes launching a public cloud gateway appliance in the public cloud service. The public cloud gateway appliance is configured with security information associated with the on-premises appliance. The on-premises appliance is provided with contact information associated with the public cloud gateway appliance. A communication channel is established, using an outbound port, from the on-premises appliance to the public cloud gateway appliance that is secured based on the security information associated with the on-premises appliance and the contact information associated with the public cloud gateway appliance.

20 Claims, 10 Drawing Sheets

(56) References Cited

U.S. PATENT DOCUMENTS

| | | | |
|---|---|---|---|
| 2019/0253480 A1* | 8/2019 | Chiu | H04L 63/0272 |
| 2019/0361750 A1* | 11/2019 | Sequeira | H04L 9/3268 |
| 2020/0106608 A1* | 4/2020 | Lo | H04L 63/0281 |
| 2020/0213228 A1* | 7/2020 | Cheng | H04L 45/74 |
| 2021/0026673 A1* | 1/2021 | Forney | H04L 67/1031 |
| 2021/0400029 A1* | 12/2021 | Wang | H04L 63/164 |

* cited by examiner

METHOD AND APPARATUS FOR SECURE HYBRID CLOUD CONNECTIVITY

RELATED APPLICATIONS

Benefit is claimed under 35 U.S.C. 119(a)-(d) to Foreign Application Serial No. 202041028375 filed in India entitled "METHOD AND APPARATUS FOR SECURE HYBRID CLOUD CONNECTIVITY", on Jul. 03, 2020, by VMware, Inc., which is herein incorporated in its entirety by reference for all purposes.

BACKGROUND

Cloud computing and cloud storage systems are used in cloud architectures by cloud computing providers, which may also be referred to as cloud services providers, to offer various services. Examples of cloud architectures include the VMware Cloud architecture software, Amazon EC2™ web service, and OpenStack™ open source cloud computing service. One such cloud service that may be offered is an infrastructure as a service (IaaS) cloud service. IaaS cloud service is a type of cloud service that provides access to physical and/or virtual resources in a cloud environment. These cloud services provide a tenant application programming interface (API) that supports operations for manipulating IaaS constructs, such as virtual computing instances (which may be abbreviated herein as VCIs) (e.g., virtual machines (VMs)), and logical networks.

Of course, the services described above may be provided for a private cloud that includes one or more customer data centers, which may be implemented as "on-premises" or "on-prem" data centers. The services may also be provided for a public cloud that includes a multi-tenant cloud architecture providing IaaS cloud services. The services may further be provided for in a hybrid cloud system. A hybrid cloud system aggregates the resource capability from both private and public clouds to facilitate creation, deployment, maintenance, and utilization of application with minimal effort of access to those capabilities. In other words, a hybrid cloud system abstracts private, on-prem, and public cloud resources and presents them as being available in one continuous, hybrid cloud. Customers can then deploy applications over the resources offered by the hybrid cloud to take advantage of scaling and flexibility.

Often, in a hybrid cloud environment there is a need for connecting private, on-prem data centers to the public cloud so that cloud-based applications may access these on-prem resources, which may include VMs and other services. Currently, to allow access to on-prem resources, non-standard ports in the on-prem firewall need to be opened. However, opening outbound ports is not an accepted security practice because of the security risks this poses. Thus, for example, private data centers include firewalls that should not allow connectivity originating from an outside network into the private data center because of information security requirements or other security policies that need to be configured on the firewall.

With increasing adaptation of cloud computing and cloud storage by enterprises, providing secure access to on-prem data centers is never more important than it is now.

SUMMARY

System and computer-implemented method for secure hybrid cloud connectivity between an application in a public cloud service and an on-premises service supported by an on-premises appliance includes launching a public cloud gateway appliance in the public cloud service. The public cloud gateway appliance is configured with security information associated with the on-premises appliance. The on-premises appliance is provided with contact information associated with the public cloud gateway appliance. A communication channel is established, using an outbound port, from the on-premises appliance to the public cloud gateway appliance that is secured based on the security information associated with the on-premises appliance and the contact information associated with the public cloud gateway appliance.

A computer-implemented method in a cloud architecture for secure hybrid cloud connectivity between an application in a public cloud service and an on-premises service supported by an on-premises appliance in accordance with an embodiment of the invention includes launching a public cloud gateway appliance in the public cloud service, the public cloud gateway appliance configured with security information associated with the on-premises appliance. The method also includes providing the on-premises appliance with contact information associated with the public cloud gateway appliance. The method further includes establishing, using an outbound port, a communication channel from the on-premises appliance to the public cloud gateway appliance that is secured based on the security information associated with the on-premises appliance and the contact information associated with the public cloud gateway appliance. In some embodiments, the steps of this method are performed when program instructions contained in a computer-readable storage medium are executed by one or more processors.

A system in a cloud architecture for secure hybrid cloud connectivity between an application in a public cloud service and an on-premises service supported by an on-premises appliance, configured in accordance with another embodiment of the invention, includes memory and one or more processors configured to launch a public cloud gateway appliance in the public cloud service, the public cloud gateway appliance configured with security information associated with the on-premises appliance; provide the on-premises appliance with contact information associated with the public cloud gateway appliance; and establish, using an outbound port, a communication channel from the on-premises appliance to the public cloud gateway appliance that is secured based on the security information associated with the on-premises appliance and the contact information associated with the public cloud gateway appliance.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
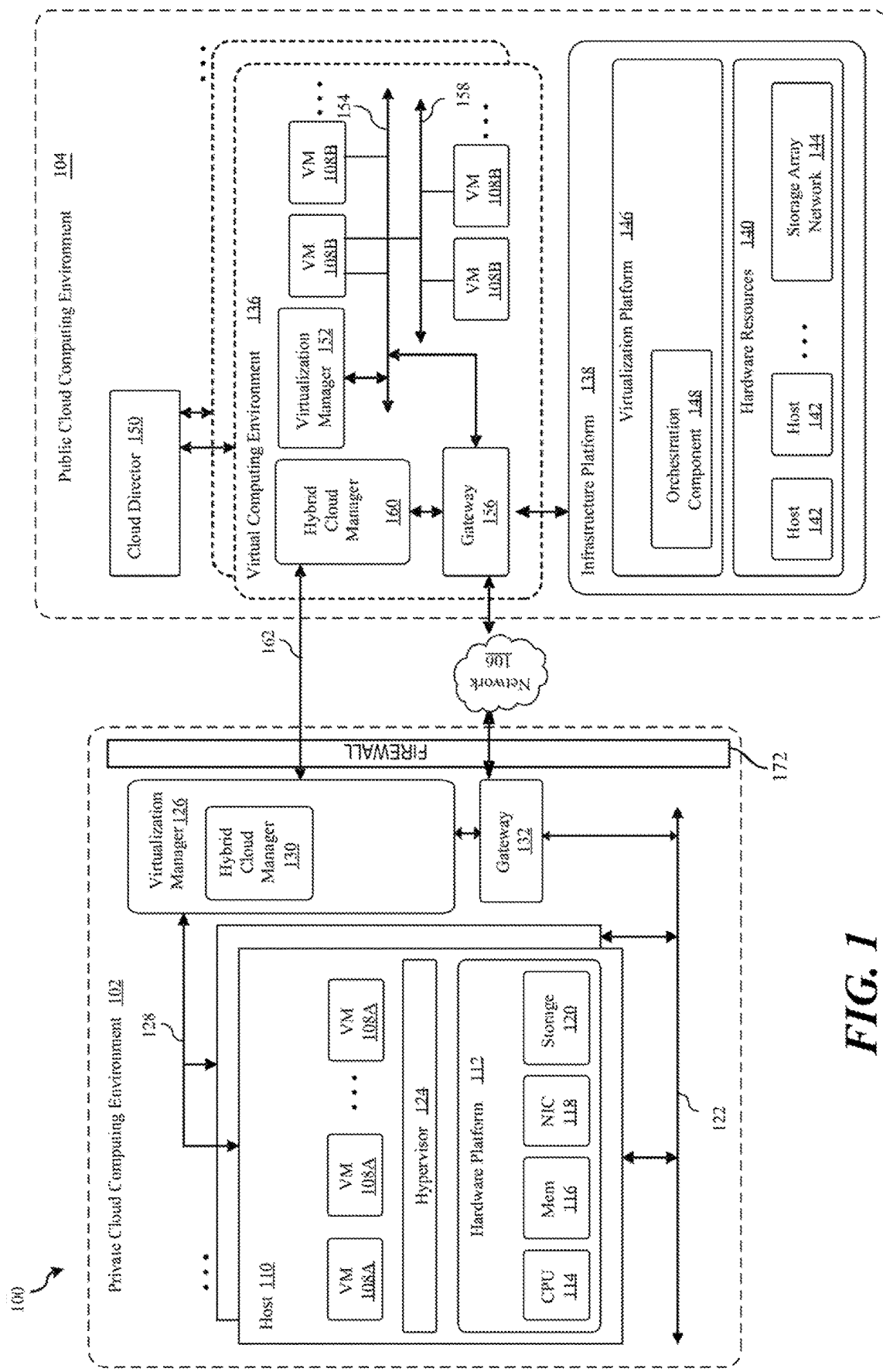
FIG. 1 is a block diagram of a hybrid cloud system that may be used to describe a method and apparatus for secure hybrid cloud connectivity configured in accordance with various aspects of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

It should be noted that although a certain figure and associated description is for a specific embodiment, the description and the figure, as well as other figures and associated description contained herein, may be used for any application of the various aspects described of the current invention. Also, in the description contained herein, unless otherwise specified any underlying hardware supporting the various components will not be described because the underlying hardware may be implemented through a myriad of options known to those of ordinary skill in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

As used herein, the terms "objects" or "computing objects" may refer to applications, services, hosts, components, sub-components, or any other entity that may communicate with other entities in the cloud architecture, and for which a proxy may be used. These may include hosts and appliances implemented using virtualization technologies provided by VMware, Inc., including VCIs created using VMware ESXi™-based hypervisors. However, objects may be implemented using any other virtualization technologies, including Xen®, Microsoft Hyper-V® and/or Docker virtualization technologies.

Typically, deployment of a network virtualization platform is on-prem, with management plane layer and control plane layer components being deployed in the on-prem environment. However, in a hybrid cloud architecture, workloads may be located in the public cloud at a cloud computing service, such those provided by Amazon AWS, Microsoft Azure, or Google Cloud. In general, various aspects of the present disclosure may extend the capabilities of the network virtualization platform from the on-prem environment to the public cloud in a cloud-agnostic way.

Various aspects of the present disclosure provide cloud applications with the ability to access on-prem services in a secure manner without affecting existing security mechanisms. In one aspect of the present disclosure, cloud applications may be provided access to on-prem services without requiring any non-standard outbound ports in the DMZ firewall be opened. In another aspect of the present disclosure, communications between cloud applications and on-prem services may occur on a totally encrypted channel. In still another aspect of the present disclosure, identification of participants in the communications channel may be authenticated.

Turning now to FIG. 1, a block diagram of a hybrid cloud system 100, which may also be referred to as a "cloud architecture," in accordance with an embodiment of the invention is shown. The hybrid cloud system 100 includes at least one private cloud computing environment 102 ("on-prem" environment) and at least one public cloud computing environment 104 that are connected via a network 106. The hybrid cloud system 100 is configured to provide a common platform for managing and executing workloads seamlessly between the private cloud computing environment 102 and the public cloud computing environment 104. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises.

The private cloud computing environment 102 and the public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. In this disclosure, the virtual computing instances will be described as being virtual machines, although embodiments of the invention described herein are applied to other types of virtual. For example, the virtual computing instances may include virtual network entities for network virtualization, as further described herein.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the system memory 116 and the storage system 120. The system memory 116 is volatile memory used for retrieving programs and processing data. The system memory 116 may include, for example, one or more random access memory (RAM) modules. The network interface 118 enables the host 110 to communicate with another device via a communication medium, such as a network 122 within the private cloud computing environment 102. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing instances, e.g., the virtual computing instances 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with each of the host 110 via a management network 128. In one embodiment, the virtualization manager 126 is a computer program that resides and executes in a computer system, such as one of the hosts, or in a virtual computing instance, such as one of the virtual computing instances 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning VMs, migrating VMs from one host to another host, and load balancing between the hosts.

The virtualization manager 126 includes a hybrid cloud manager 130. In general, the hybrid cloud manager 130 is responsible for managing and integrating computing resources provided by the private cloud computing environment 102 with computing resources provided by the public cloud computing environment 104 to form a unified "hybrid" computing platform. The hybrid cloud manager 130 may further be configured to deploy virtual computing instances, e.g., virtual computing instances 108A, in the private cloud computing environment; transfer VMs from the private cloud computing environment to the public cloud computing environment; and perform other "cross-cloud" administrative tasks.

The hybrid cloud manager 130 is configured to control network traffic into the network 106 via a gateway device 132, which may be implemented as a virtual appliance. The gateway device 132 is configured to provide the virtual computing instances 108A and other devices in the private cloud computing environment 102 with connectivity to external devices via the network 106. The gateway device 132 may manage external public Internet Protocol (IP) addresses for the virtual computing instances 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual computing instances 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual computing instances 108B across the hosts 142. The virtualization platform may be implemented using one or more software programs that reside and execute in one or more computer systems, such as the hosts 142, or in one or more virtual computing instances, such as the virtual computing instances 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running, on the hosts 142, VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director 150 may be accessible to users via a REST (Representational State Transfer) API (Application Programming interface) or any other client-server communication protocol. The cloud director 150 may authenticate connection attempts from the enterprise using credentials issued by the cloud computing provider. The cloud director 150 receives provisioning requests submitted (e.g., via REST API calls) and may propagate such requests to the orchestration component 148 to instantiate the requested virtual machines (e.g., the virtual computing instances 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual computing instances 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual computing instances 108B running in that environment and managed by at least one networking gateway device 156, as well as one or more isolated internal networks 158 not connected to the gateway device 156. The gateway device 156, which may be a virtual appliance, is configured to provide the virtual computing instances 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud manager 160 configured to communicate with the corresponding hybrid cloud manager 130 in the private cloud computing environment 102 to enable a common virtualized computing platform between the private and public cloud computing environments. The hybrid cloud manager 160 may communicate with the hybrid cloud manager 130 using Internet-based traffic via a VPN tunnel established between the gateway device 132 and the gateway device 156, or alternatively, using a direct connection 162. The hybrid cloud manager 160 and the corresponding hybrid cloud manager 130 facilitate cross-cloud migration of virtual computing instances, such as virtual computing instances 108A and 108B, between the private and public computing environments. This cross-cloud migration may include both "cold migration" in which the virtual machine is powered off during migration, as well as "hot migration" in which the virtual machine is powered on during migration.

In one embodiment, a firewall 172 may be used to examine and filter the traffic being sent from the private cloud computing environment 102 and the public cloud computing environment 104. The firewall 172 is located at the private cloud computing environment 102. In other words, the firewall 172 is on-prem.

Figure 2:
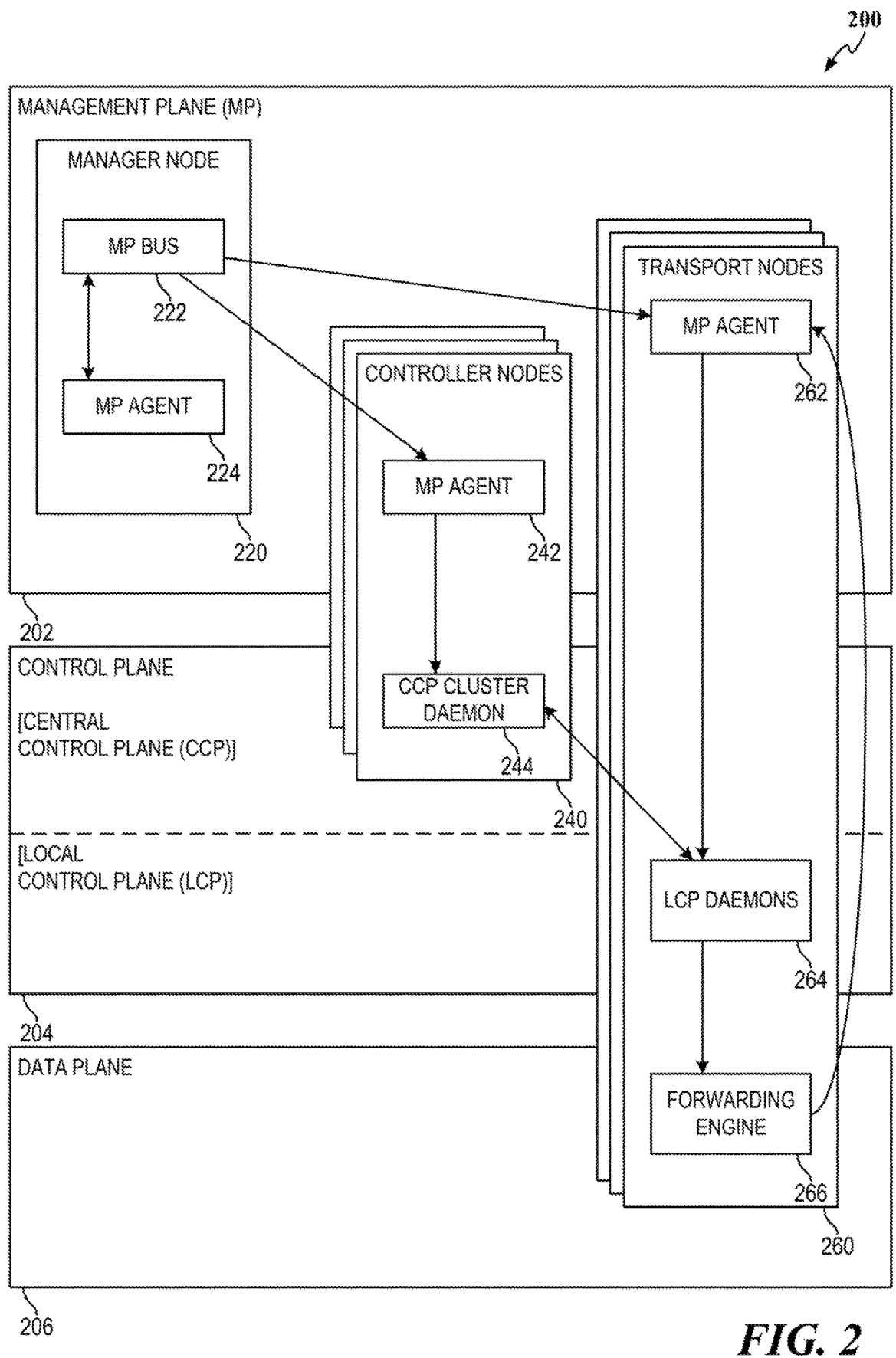
FIG. 2 is a block diagram of a network virtualization architecture that may be used in the method and apparatus for secure hybrid cloud connectivity configured in accordance with various aspects of the invention.

FIG. 2 illustrates a network virtualization architecture 200 that includes components that may be used to implement the method and apparatus for secure hybrid cloud connectivity configured in accordance with various aspects of the invention. In much the same way that server virtualization programmatically creates, snapshots, deletes and restores software-based virtual machines, network virtualization may programmatically create, delete, and restore software-based virtual networks. With network virtualization, the functional equivalent of a network hypervisor may reproduce the complete set of Layer 2 through Layer 7 networking services from the Open Systems Interconnection (OSI) model in software. As a result, these services, which may include switching, routing, access control, firewalling, and QoS, may be programmatically assembled in any arbitrary combination to produce unique, isolated virtual networks in a matter of seconds.

Referring to FIG. 2, the network virtualization architecture 200 includes three separate but integrated planes: a management plane (MP) 202, a control plane 204, and a data plane 206. In accordance with various aspects of the disclosure, the management plane 202 may provide a single API entry point to the network virtualization architecture 200 as well as persist user configuration, handle user queries, and perform operational tasks on all management, control, and data plane nodes in the network virtualization architecture 200.

The control plane 204, which is used to provide signaling for the network virtualization architecture 200, may compute all ephemeral runtime state based on configuration information from the management plane 202, disseminate topology information reported by elements in the control plane 204, and push stateless configuration to forwarding engines, as described herein. In accordance with one aspect of the disclosure, the control plane 204 may be split into a central control plane (CCP) and a local control plane (LCP).

The data plane 206 may provide stateless forwarding/ transformation of packets based on tables populated by the control plane 204, reports topology information to the control plane 204, and maintains packet level statistics. In general, the three planes are implemented as a set of processes, modules, and agents residing on three types of nodes: manager, controller, and transport nodes, as further described herein.

In accordance with one aspect of the disclosure, the network virtualization architecture 200 supports a single manager node in the management plane 202 such as a manager node 220 that may be used to host API services. The manager node 220 may be implemented on a VM and includes an MP bus 222 and an MP agent 224.

Moreover, the network virtualization architecture 200 includes one or more transport nodes such as a set of transport nodes 260 that may host MP agents, local control plane (LCP) daemons and forwarding engines. For example, a transport node is shown that includes an MP agent 262, an LCP daemon 264, and a forwarding engine 266. In one aspect of the disclosed approach, the local control plane of the control plane 204 may be run on the set of transport nodes 260. The local control plane may be used to monitor local link status, computes most ephemeral runtime state based on updates from a data plane such as the data plane 206, and the central control plane, and pushes stateless configuration to forwarding engines such as the forwarding engine 266.

Figure 3:
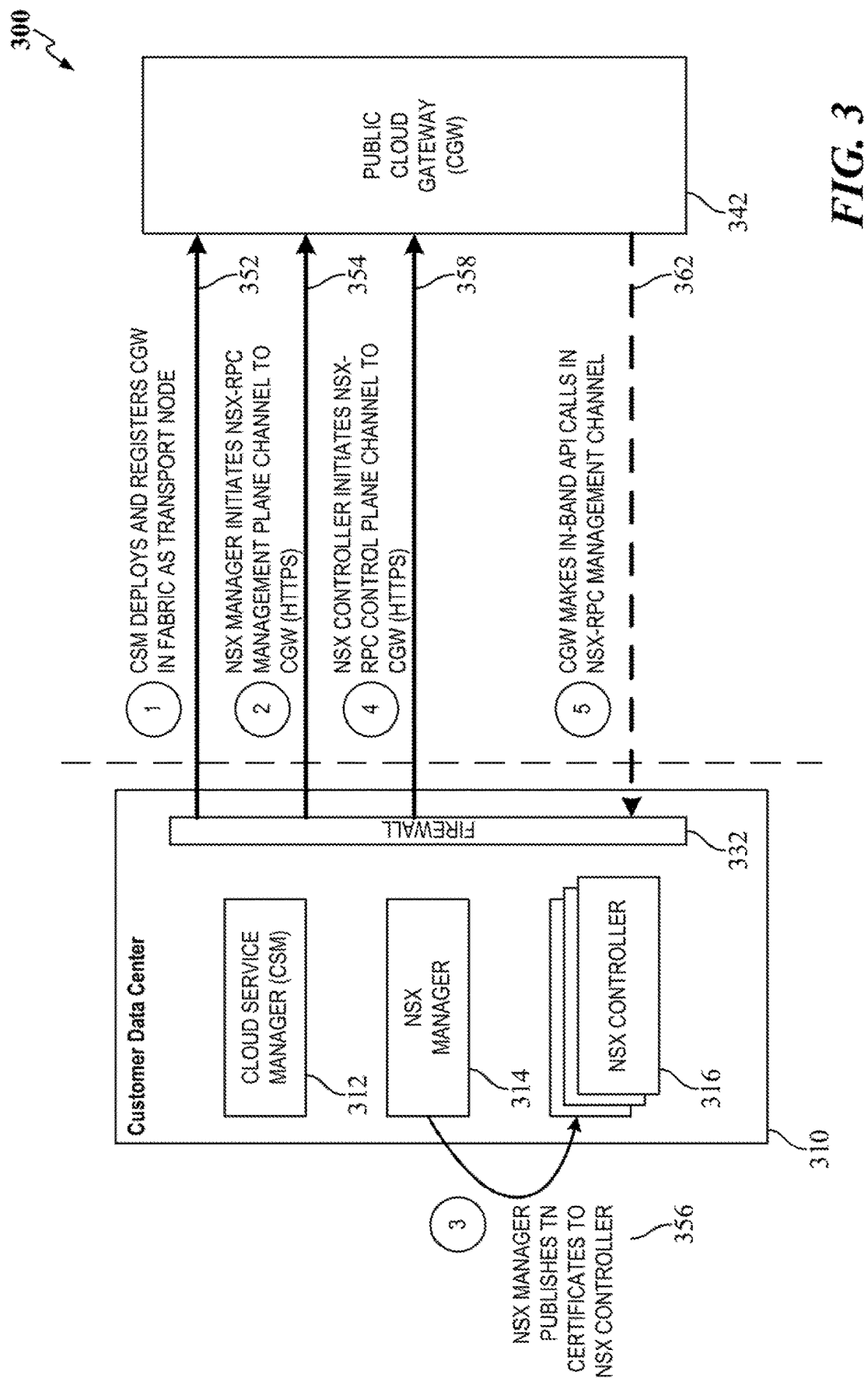
FIG. 3 is a block diagram of an overview of the method and apparatus for secure hybrid cloud connectivity in accordance with various aspects of the invention.

FIG. 3 illustrates, at a high level, an opening of an on-prem initiated connection for a hybrid cloud connectivity architecture 300 that highlights how an on-prem application such as a cloud service manager 312 at a customer data center 310 may initiate a secure communication channel with an application in the public cloud (not shown). In addition to the cloud service manager 312, the customer data center 310 of the hybrid cloud connectivity architecture 300 includes a VMware NSX® manager 314, a VMware NSX® controller 316, and a firewall 332. A cloud gateway (CGW) 342 is used as a gateway between the customer data center 310 and the public cloud, as further described herein. During the description of FIG. 3, reference will also be made to FIG. 4, which illustrates a connection establishment process 400.

In accordance with various aspects of the present disclosure, the NSX manager 314 provides centralized network management as the primary management plane interface for configuration of network resources within the network virtualization platform and may provide an aggregated system view. Thus, the NSX manager 314 represents the management plane. The NSX manager 314 is responsible for the deployment and management of virtualized network components and functions used to support the creation of network services using virtual network functions. Such functions include network segments, routing, firewalling, and load balancing, etc. In one aspect of the present disclosure, the NSX manager 314 may be implemented as a virtual appliance on any host in the on-prem environment. For example, on-prem components may be any of the components in the private cloud computing environment 102.

In accordance with various aspects of the present disclosure, the NSX controller 316 may provide a central control point for all logical switches within a network. The NSX controller 316 may maintain information about all VMs, hosts, logical switches, and virtual networks. In one aspect of the present disclosure, the NSX controller 316 may be implemented as a cluster of controllers.

In general, the cloud service manager 312, which is deployed on-prem for a cloud management plane dealing with management of resources in the public cloud, may connect to the public cloud and connectivity is established in such a way that, from the perspective of the customer data center 310, there is never a connection request that is initiated from the public cloud. Thus, as far as the firewall 332 is concerned, all request for connectivity between the customer data center 310 and the public cloud is outbound. Unless otherwise noted herein, all communications that originate from the customer data center 310 to the public cloud will be referred to as being "outbound." Conversely, any connection requests that would originate from the public cloud to the customer data center 310 would be referred to as being "inbound." Also as explained further herein, all connections from the customer data center 310 to the public cloud may still be established with trust. Moreover, the communications between the customer data center 310 and the public cloud may be completely encrypted.

Figure 4:
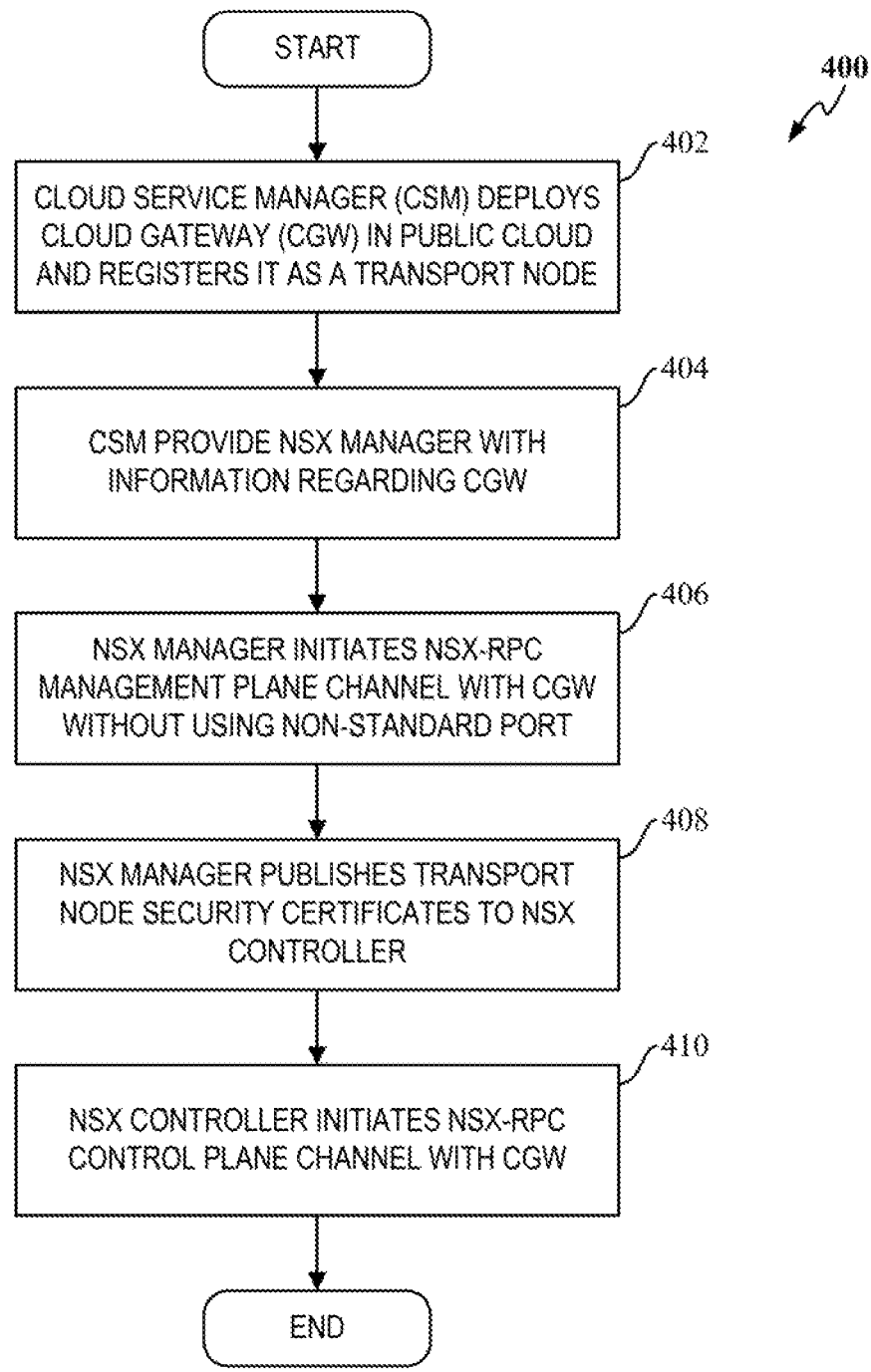
FIG. 4 is a flow diagram of an connection establishment process configured in accordance with various aspects of the invention that may be used in the method and apparatus for secure hybrid cloud connectivity described in FIG. 3.

Referring to operation 352 of FIG. 3 but also referring to FIG. 4, at step 402 the cloud service manager 312 deploys the cloud gateway 342 on a VM. In accordance with one aspect of the disclosure, the VM is created in the public cloud. For example, the VM may be created in a cloud computing provider such as Amazon AWS, Microsoft Azure, or other cloud computing provider.

At step 404, once the cloud service manager 312 has launched the cloud gateway 342, the cloud service manager 312 may then inform the NSX manager 314 with certain details of the public cloud gateway 342. The details provided by the cloud service manager 312 to the NSX manager 314 may include, for example, the IP address of the VM hosting the cloud gateway 342. Other details that may need to be provided to the NSX manager 314 is further described herein.

Referring to operation 354 of FIG. 3 but also still referring to FIG. 4, at step 406, once the NSX manager 314 receives information about the VM hosting the cloud gateway 342 (e.g., the IP address of the VM) from the cloud service manager 312, the NSX manager 314 may initiate an outbound connection to the cloud gateway 342. Thus, the NSX manager 314 may initiate a connection to the VM hosting the cloud gateway 342. In one aspect of the present disclosure, the outbound connection may be established by the NSX manager 314 to initiate a remote procedure call (RPC) channel, referred to herein as an "NSX-RPC channel", for a management plane such as the management plane 202 of FIG. 2 that is secured using hypertext transport protocol secure (HTTPS).

The NSX manager 314 may open a transmission control protocol (TCP) socket using a standard port that the firewall 332 may already allow. An example port that may be used is port 443, which is the standard port using which HTTPS traffic is typically communicated. It should be noted that before the cloud gateway 342 receives a connection request from the NSX manager 314 at operation 354, the cloud gateway 342 will not attempt to initiate an "inbound" connection to the customer data center 310. Thus, no inbound connections will be created because the cloud gateway 342 waits for the NSX manager 314 to create the outbound connection.

The HTTPS communication protocol between the NSX manager 314 and the cloud gateway 342 may be encrypted using transport layer security (TLS). The HTTPS communication protocol also provides for authentication of the participants in the connection as well as integrity of exchanged data. Although a detailed discussion of the HTTPS and TLS protocols is not included herein because these protocols are well-understood by those skilled in the art, the following is a brief summary of the functionality and benefits of these protocols. It should be noted that the term "security information" may refer to cryptography keys, thumbprints, certificates, and other information necessary for securing communications between the various entities described herein.

HTTPS connections may be secured because cryptography is used to encrypt transmitted data. In order to achieve symmetrical encryption, cryptographic keys are uniquely generated for each connection and are based on a shared secret that was negotiated at the start of the session during a TLS "handshake" process. Negotiation of the shared secret is both secure in that the negotiated secret is unavailable to eavesdroppers (e.g., man-in-the-middle) and reliable in that no attacker can modify the communications during the negotiation without being detected. Identity of the communicating parties can be authenticated using public-key cryptography techniques, including the use of both public and private keys. Authentication may be optional but is generally required for at least one of the parties. Participants negotiate the details of which encryption algorithm and cryptographic keys are to be used before the first byte of data is transmitted.

At step 408 of FIG. 4, in operation 356 of FIG. 3 the NSX manager 314 publishes a set of credentials associated with the cloud gateway 342 to the NSX controller. Specifically, the set of credentials includes security certificates for the transport nodes (which may be referred to as "TN certificates" herein) that may be used for securing HTTPS traffic. The exchange of the set of credentials as well as other security information to be used in secured communications is described further herein.

At step 410 of FIG. 4, in operation 358 of FIG. 3, the NSX controller 316 initiates a connection to the cloud gateway 342 for a control plane such as the control plane 204 of FIG. 2 over HTTPS. Specifically, the NSX controller initiates an NSX-RPC control plane channel for the control plane layer to the cloud gateway 342 in a manner similar to the way the NSX manager 314 initiates its NSX-RPC management plane channel. At this stage, a connection between the customer data center 310 and the cloud gateway 342 may be opened.

In operation 362, after communications have been established, the details of which will be discussed further herein, the cloud gateway 342 may use an NSX-RPC management channel to communicate with the customer data center 310. Various aspects of the present disclosure utilize a programmatic API to automate management activities. For example, the cloud gateway 342 may make in-band API calls in the NSX-RPC management channel. In one aspect of the present disclosure, clients may interact with the API using web service calls over the HTTPS protocol. In another aspect of the present disclosure, the API follows a resource-oriented REST architecture, using JavaScript object notation (JSON) object encoding, where each API method is identified by a request method and uniform resource identifier (URI). It should be noted that those skilled in the art are familiar with the API/REST architecture/JSON concepts and a detailed description of these concepts would unnecessarily detract from the description of various aspects of the invention.

Figure 5:
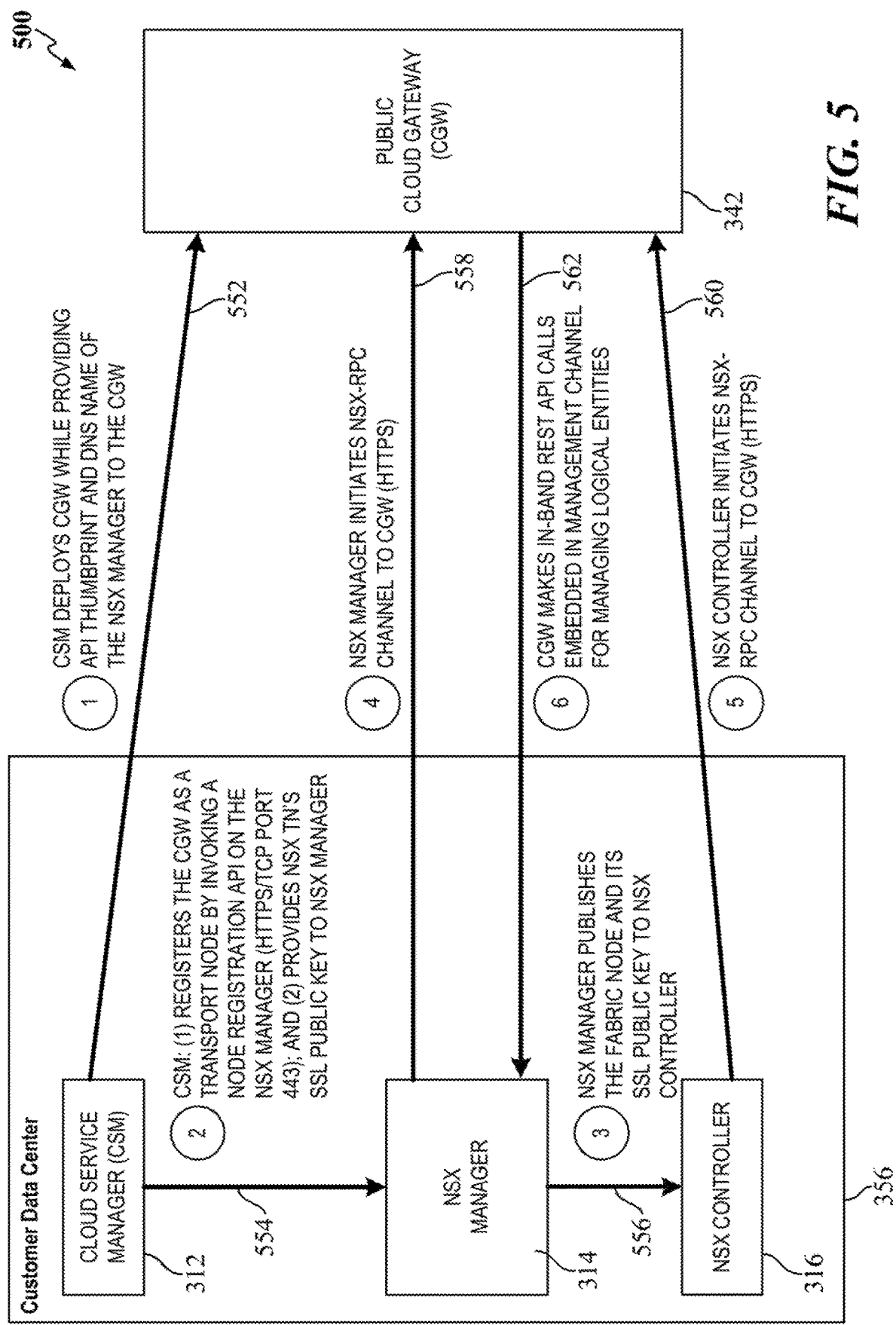
FIG. 5 is a block diagram of an architecture for establishment of management plane and control plane channels of the method and apparatus for secure hybrid cloud connectivity configured in accordance with various aspects of the invention.

FIG. 5 illustrates a channel establishment architecture 500 of a channel for initiating a management plane channel and a control plane channel by the NSX manager 314 and the NSX controller 316, respectively, to the cloud gateway 342 of FIG. 3. Various elements from FIG. 3 have been omitted in FIG. 5 to avoid unnecessarily complicating the drawing. For example, the representations of the customer data center 310 and the firewall 332 are not presented in FIG. 5. However, it should be noted that the elements that are not represented may still operate as described in the other figures. During the description of FIG. 5, reference will also be made to FIG. 6, which illustrates a channel establishment process 600.

Figure 6:
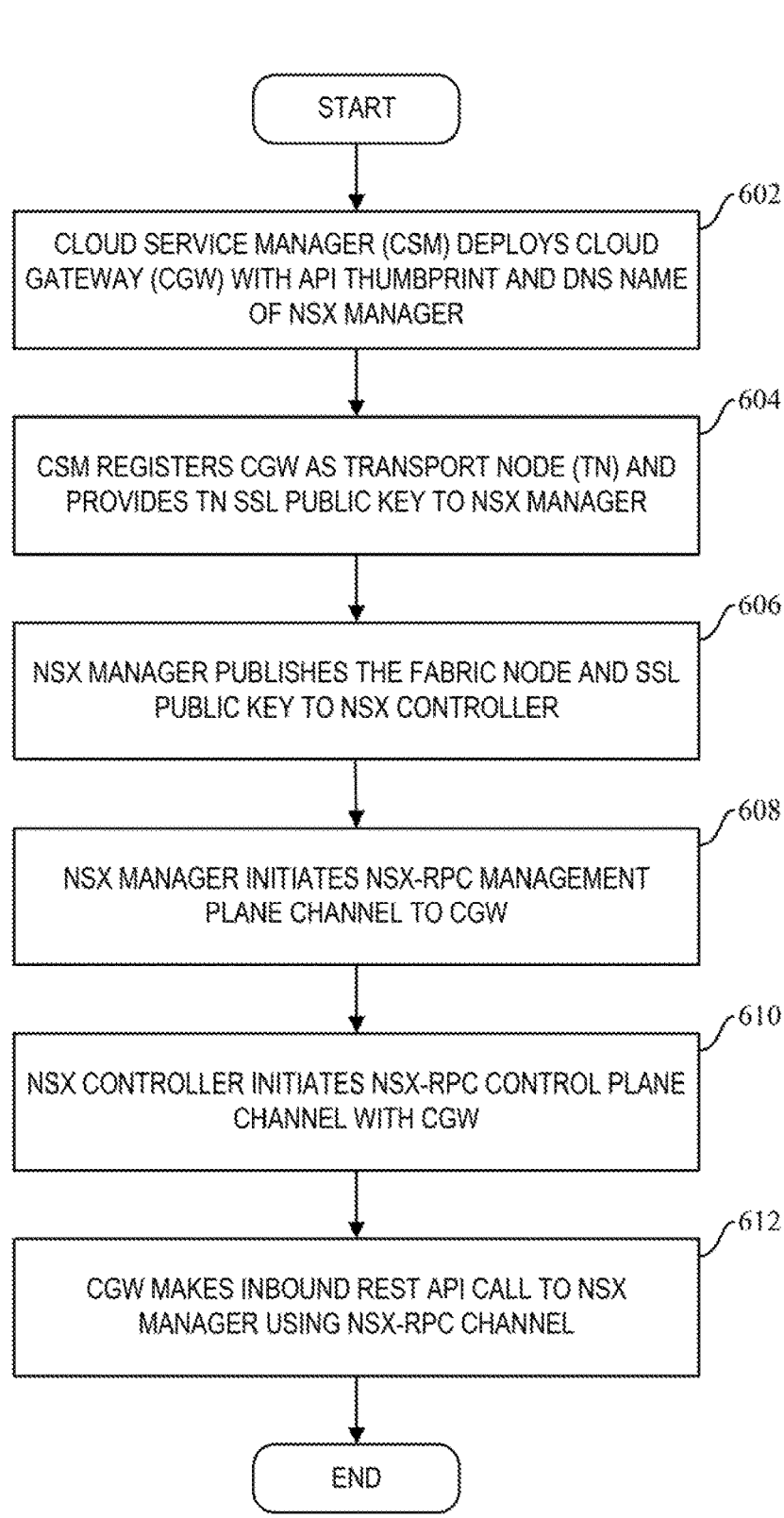
FIG. 6 is a flow diagram of a channel establishment process configured in accordance with various aspects of the invention that may be used in the method and apparatus for secure hybrid cloud connectivity described in FIG. 3.

At step 602 of FIG. 6, which is illustrated as operation 552 of FIG. 5, the cloud service manager 312 deploys the cloud gateway 342. In one aspect of the present disclosure, as discussed above, the cloud service manager 312 launches a VM that will host the cloud gateway 342 in the public cloud, which may be at a public cloud service. When the VM is being launched, the cloud service manager 312 will include details about the NSX manager 314 to be stored in the VM. In one aspect of the present disclosure, the details may include a DNS name and a unique identifier (i.e., thumbprint), for the NSX manager 314.

In other words, during initialization of the VM hosting the cloud gateway 342, information that may be used to identify and authenticate the identity of the NSX manager 314 may be pre-programmed into the VM to be later used by the cloud gateway 342. Thus, if an unauthorized entity attempts a man-in-the-middle attack or attempts to make a connection with the cloud gateway 342, then the connection will not be allowed by the cloud gateway 342 because the thumbprint will only be known between the cloud service manager 312 and the cloud gateway 342 and the unauthorized entity will not have the thumbprint. As further described herein, once trust is established between the cloud service manager 312 and the cloud gateway 342, then the cloud gateway 342 can make REST API calls to the NSX manager 314. The NSX manager 314 may trust the legitimacy of the API call coming from the cloud gateway 342 because the certificate for the cloud gateway 342 was previously provided to the NSX manager 314 by the cloud service manager 312.

At step 604 of FIG. 6, which is illustrated as operation 554 of FIG. 5, the cloud service manager 312 may then both initiate onboarding of the cloud gateway 342 as a transport node in the NSX network fabric and, at the same time, provide security information of the cloud gateway 342 to the NSX manager 314. In accordance with one aspect of the disclosure, to onboard the cloud gateway 342 in the NSX network fabric, the cloud service manager 312 may issue a command to the NSX manager 314 using an API provided by the NSX manager 314. The API command, which may be implemented by a REST architecture may request that the cloud gateway 342 be allowed to join the NSX fabric using an API command. Further, the cloud service manager 312 registers the cloud gateway 342 as a transport node by providing, to the NSX manager 314, information for the newly launched cloud gateway 342. In one aspect of the present disclosure, the information may include the IP address, port, and other details, as well as a security certificate (e.g., a secure socket layer (SSL) certificate) for the cloud gateway 342. The information may be provided as part of the API command.

At step 606 of FIG. 6, which is illustrated as operation 556 of FIG. 5, the NSX manager publishes information for the transport node and the security information that it previously received from the CSM to the NSX controller. For example, the security information may include the security certificate (e.g., SSL certificate) for the cloud gateway 342.

At step 608 of FIG. 6, which is illustrated as operation 558 of FIG. 5, the NSX manager 314 initiates a management plane channel to the cloud gateway 342 using the security information of the cloud gateway 342 received from the cloud service manager 312. In order to initiate the management plane channel, trust establishment between the NSX manager 314 and the cloud gateway 342 has to occur and that requires both the NSX manager 314 and the cloud gateway 342 have security information about each other. Specifically, the cloud gateway 342 has the API thumbprint of the NSX manager 314, which was pre-programmed by the cloud service manager 312 into the cloud gateway 342 during deployment, as discussed above. In addition, the NSX manager 314 also has the SSL public key of the cloud gateway 342 that was earlier provided by the cloud service manager 312. The cloud service manager 312 and the NSX manager 314 already trust each other because they are both on-prem.

At step 610 of FIG. 6, which is illustrated as operation 560 of FIG. 5, the NSX controller 316 initiates a control plane channel to the cloud gateway 342 using information published by the NSX manager 314.

At step 612 of FIG. 6, which is illustrated as operation 562 of FIG. 5, after the NSX-RPC channel has been initiated, the cloud gateway 342 may make inbound REST API calls to the NSX manager using the NSX-RPC channel, as further described herein.

Figure 7:
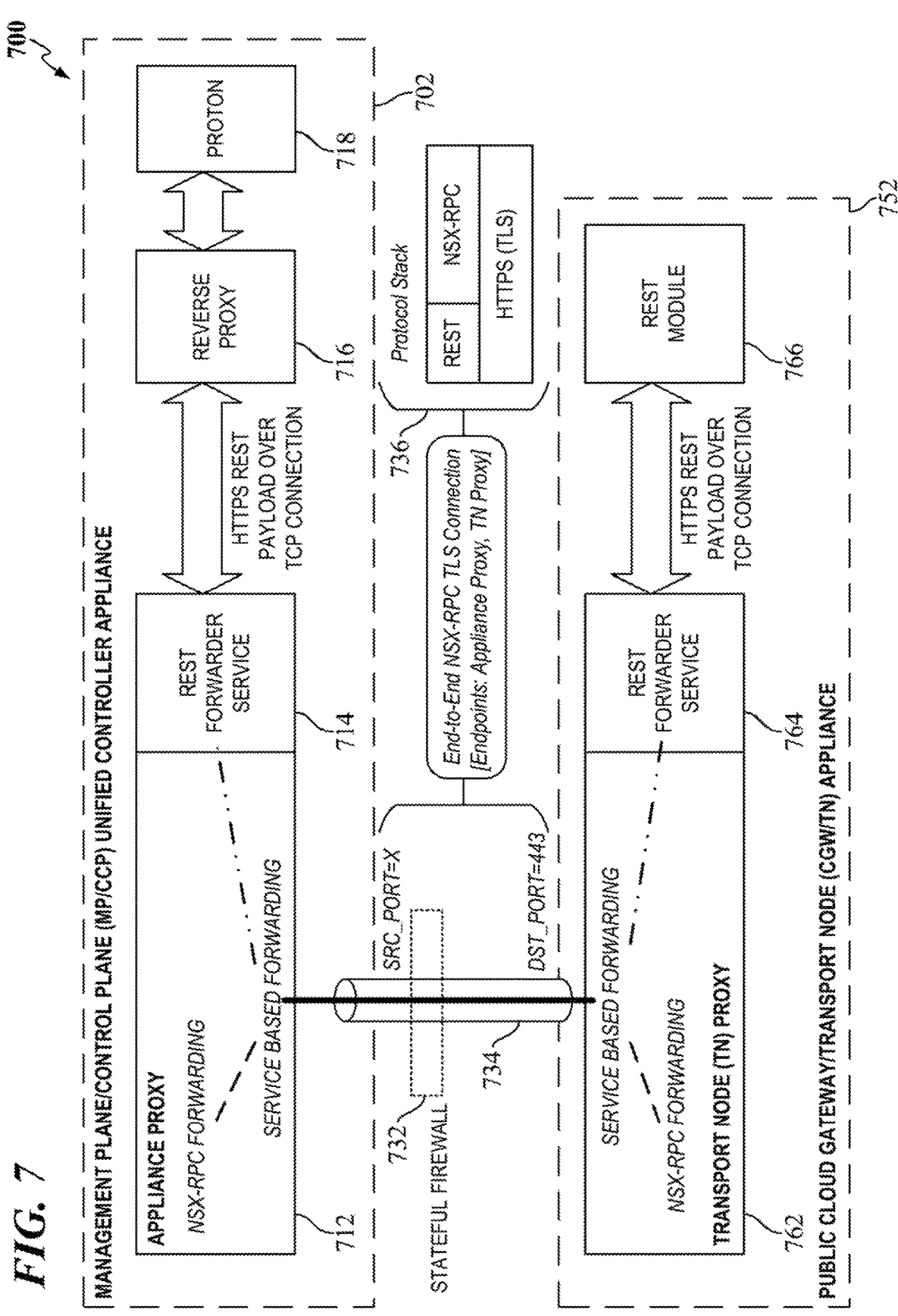
FIG. 7 is a block diagram of a secure communication architecture of the method and apparatus for secure hybrid cloud connectivity configured in accordance with various aspects of the invention.

FIG. 7 illustrates a secure communication architecture 700 with an NSX-RPC channel 734 configured in accordance with various aspects of the disclosure. The secure communication architecture 700 includes two main parts that may be used to establish the NSX-RPC channel 734, the first being a management plane/central control plane (MP/CCP) unified controller appliance 702 that may be deployed in an on-prem environment such as the customer data center 310 as illustrated in FIG. 3, above, and the second being a public cloud gateway/transport node (CGW/TN) appliance 752, which is deployed in the public cloud. These two parts contain components that are responsible for establishing the NSX-RPC channel 734, as further described herein.

The MP/CCP unified controller appliance 702 includes an appliance proxy component 712 that itself includes a REST forwarder service 714. The appliance proxy component 712 may be considered to be part of the NSX manager 314. The MP/CCP unified controller appliance 702 also includes a reverse proxy component 716, and a proton component 718. In one aspect of the present disclosure, the MP/CCP unified controller appliance 702 provides functionality for the management plane and control plane layers. The reverse proxy component 716 implements a general reverse proxy function provided by tools like the NGNIX open-source reverse proxy server.

The CGW/TN appliance 752 includes a transport node (TN) proxy component 762 that includes a REST forwarder service 764, and a REST component 766. In one aspect of the present disclosure, the CGW/TN appliance 752 may be deployed as a VM.

In general, the MP/CCP unified controller appliance 702 and the CGW/TN appliance 752 work together to open the TCP socket in the firewall 732. In one aspect of the present disclosure, the TN proxy component 762 of the MP/CCP unified controller appliance 702 may be implemented as a server service. Specifically, when the CGW/TN appliance 752 is deployed as a VM in the cloud, the CGW/TN appliance 752 will have the TN proxy component 762 already up and running. In addition, the TN proxy component 762 starts in a listening mode and awaits a connection from the MP/CCP unified controller appliance 702. Specifically, the appliance proxy component 712 of the MP/CCP unified controller appliance 702 initiate a connection to the TN proxy component 762.

In accordance with various aspects of the present disclosure, the proton component 718 may implement functionality provided by the NSX manager 314. In accordance with one aspect of the disclosure, the proton component 718 may invoke the appliance proxy component 712 to setup a connection profile from the appliance proxy component 712 to the TN proxy component 762, which may be referred to as a "TN proxy connection profile". The TN proxy connection profile may include information about whether the MP initiated a join or not and may have an IP address and a port number to reach the CGW/TN appliance 752 so as to make a connection. As noted, in one aspect of the disclosure, the port number may identify a secure port that is customarily opened in a stateful firewall component. The connection should be initiated from MP because the TN proxy component 762 does not know the IP address and port. Thus, in the TN proxy component 762 profile this information is needed so that the MP can initiate a join.

The proton component 718 may be implemented as a web service running on the MP/CCP unified controller appliance 702 as a management plane function. The proton component 718 is responsible for invoking the proxy service to set up a TN connection profile. When the TN proxy component 762 is initiated in the public cloud the proton component 718 will initialize information necessary to connect to the TN proxy component 762, such as IP address and port information for the TN proxy component 762. Thus, the appliance proxy component 712 may be made aware of the status of the TN proxy component 762 in the public cloud by the proton component 718 so connection requests will only be sent to legitimate servers.

The TN proxy component 762, which is an off-prem component, is configured to not initiate an inbound connection to the appliance proxy component 712, which is an on-premises component. Thus, in contrast to an architecture that uses a server at an on-prem environment that awaits inbound connections from the public cloud, various aspects of the present disclosure create an architecture where outbound connections are initiated from a component located in an on-prem environment to an off-prem component (i.e., a component in the public cloud) to provide inbound connectivity for applications deployed in the public cloud.

From the perspective of the firewall 732, all inbound connection requests (i.e., connection requests that do not originate from an on-prem entity) are eliminated because the TN proxy component 762 is configured, similar to a server, to wait for a connection request from the appliance proxy component 712. In accordance with one aspect of the disclosure, any connection requests made by the appliance proxy component 712 to the TN proxy component 762 will be made on a particular standard port. As almost all on-prem firewall policies allow for a TCP port such as 443 to be used for secure outbound connections, the appliance proxy component 712 may use this standard port as the destination port for the TN proxy component 762, illustrated in FIG. 7 as DST_PORT=443. A protocol stack 736 for the NSX-RPC channel 734 includes use of REST and NSX-RPC over HTTPS (TLS).

With unified messaging, communications between the MP/CCP unified controller appliance 702 and the TN proxy component 762 will be over the NSX-RPC channel. To support the cloud use case, this communication channel should look like an HTTPS channel. The communications may go through a firewall such as the firewall 732 but as the channel will be TLS encrypted end-to-end, the firewall component will not be able to perform deep packet inspections on the packets.

In one aspect of the present disclosure, when an API call is made from the TN proxy component 762 to the appliance proxy component 712 over the NSX-RPC channel, a REST API call is made that will be supposed by the REST API service provided by the reverse proxy component 716. To facilitate the REST API call, the REST forwarder service 714 may be used to forwards calls from the appliance proxy component 712 to the reverse proxy component 716.

In order to ensure authentication and integrity of a communication channel such as the NSX-RPC channel 734 of FIG. 7, security information needs to be exchanged between the appliance proxy component 712 and the TN proxy component 762. In one aspect of the present disclosure, where the NSX-RPC channel 734 is implemented using HTTPS, security certificates need to be exchanged out-of-band between the appliance proxy component 712 and the TN proxy component 762. The exchange may be facilitated by the CSM, which releases certificates received from both: (1) the appliance proxy component to the TN proxy component; and (2) the TN proxy component to the appliance proxy component.

In accordance to various aspects of the disclosed approach, when the TN proxy component 762 first comes up, it will start listening on specified port and wait for an incoming TCP connections. In addition, in accordance with one aspect of the disclosure, should the appliance proxy component 712 lose connectivity with the TN proxy component 762 on the NSX-RPC channel 734, the proton component 718 may be notified through detection of closures of streams for services. The proton component 718 may conclude loss of end-to-end connectivity with the TN proxy component 762 through heartbeat misses as well. As the appliance proxy component 712 will make use of NSX-RPC connection keepers to manage connections with the CGW/TN appliance 752, these connection keepers will try to restore connectivity with the TN proxy component 762. In one aspect of the current disclosure, there may be one connection keeper for each CGW/TN appliance 752 to which the appliance proxy component 712 is associated.

The NSX-RPC channel 734 may be reliability established. Thus, after a connection is made, but because of a bad network connection or some other reason the connection goes away, the CGW/TN appliance 752 will still be up and running and listening to allow the appliance proxy component 712 to reinitiate the connection. In accordance with various aspects of the present disclosure, a heartbeat mechanism where the appliance proxy component 712 may continuously be notified that the connection available similar the TN proxy component 762 will be listening. Thus, the appliance proxy component 712 may continuously be notified of the status of the NSX-RPC channel 734. In accordance with one aspect of the present disclosure, the heartbeat mechanism may be used to continuously update the appliance proxy component 712 of a disconnection. In another aspect of the present disclosure, the heartbeat mechanism may be used to provide other information about the NSX-RPC channel 734, such as quality of connection and other statistics. The heartbeat mechanism may be implemented as a software service. In one aspect of the current disclosure, this software service may be an internal service included in both the TN proxy component 762 and the appliance proxy component 712.

The appliance proxy component 712 may be configured to detect if there is a loss of connectivity to the CGW/TN appliance 752 and if there is, the proton component 718 may be notified. If the proton component 718 is notified of a loss of connectivity, then it will try to reestablish connection to the CGW/TN appliance 752. In accordance with another aspect of the present disclosure, should the CGW/TN appliance 752 need to be removed from the network fabric, the appliance proxy component 712 may be instructed by the proton component 718 to remove the connection profile for the specified CGW/TN appliance 752.

The appliance proxy component 712 may connect to multiple TN proxy components. Many connections may be made by the appliance proxy component 712 to establish a one-to-many communication channel. The appliance proxy component 712 may manage connection through using multiple public cloud managers like the public cloud manager 804. In accordance with one aspect of the disclosure, a software service referred to as a "connection keeper" may be used to maintain connection status information for each TN proxy component. In accordance with another aspect of the disclosure, a single connection keeper may be used to monitor connections to all TN proxy components. Thus, when a connection is lost from the on-prem side with anything in the public cloud, one or more connection keepers in the appliance proxy component 712 may detect and report the loss. In addition to providing information about connection statistics, the connection keeper may also be configured to restore connectivity.

The appliance proxy component may connect to multiple public cloud gateways, so there are multiple connections keepers in one appliance proxy component. Thus, an appliance proxy component may have multiple connections and each of these connection keepers may help the appliance proxy component maintain the connection to the CGW/TN appliance 752.

Figure 8:
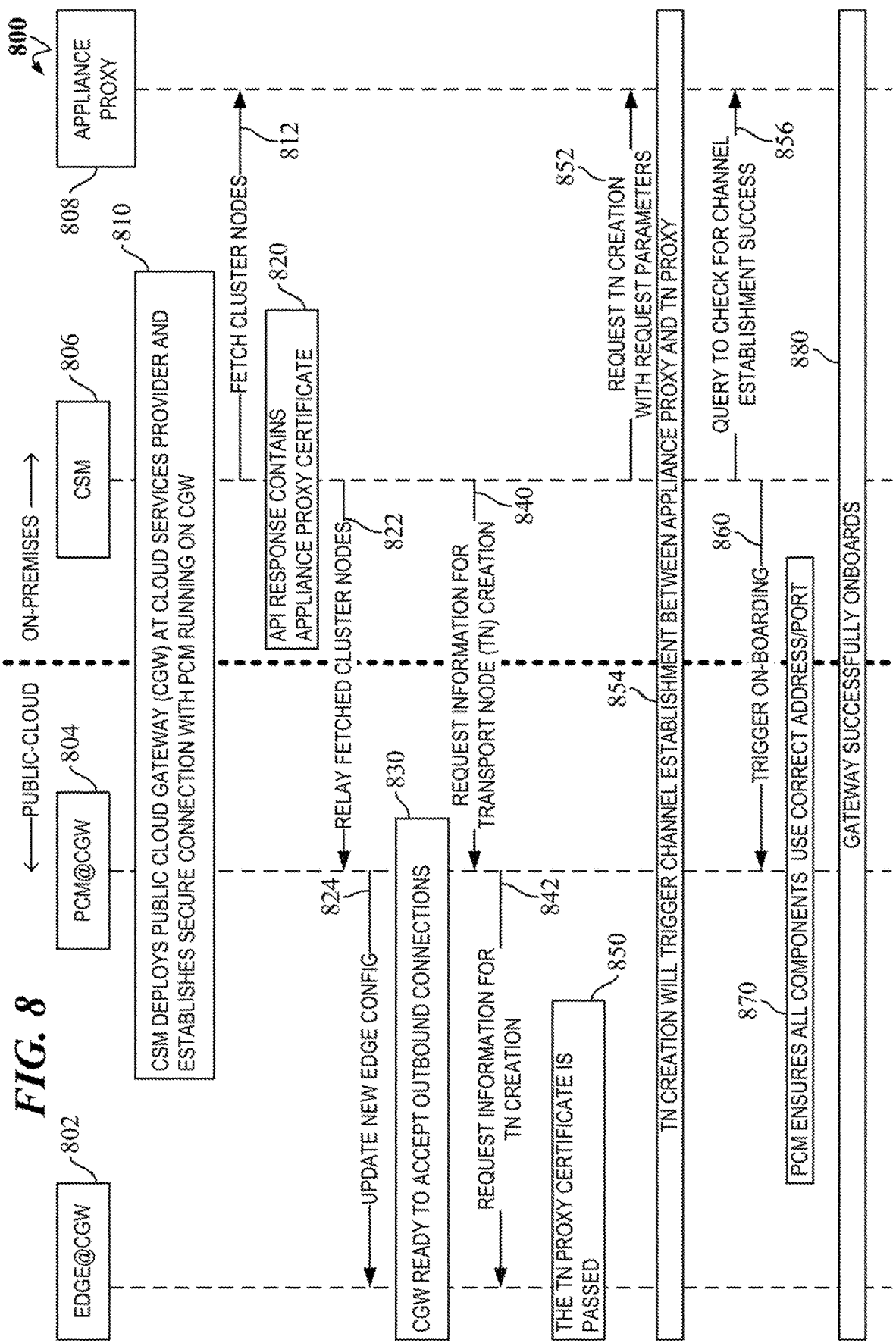
FIG. 8 is a sequence diagram of interactions between various elements in the method and apparatus for secure hybrid cloud connectivity configured in accordance with various aspects of the invention.

FIG. 8 is a sequence diagram that illustrates a secure connection establishment process 800, configured in accordance to various aspects of the method and apparatus for secure hybrid cloud connectivity, to allow secure communications between the appliance proxy component, which is located on-prem, and the TN proxy component 762, which is in the public cloud. In accordance with one aspect of the present disclosure, the secure communications occur over the NSX-RPC channel 734 and the outbound connectivity bootstrapping process 800 includes an exchange of security information necessary to establish the Nsx-rpc channel 734, which includes security certificates for the appliance proxy component 712 and the TN proxy component 762. In another aspect of the present disclosure, this exchange of security information occurs out-of-band, which means the exchange does not occur over the Nsx-rpc channel 734. In general, the secure connection establishment process 800 first prepares the TN proxy component 762 to accept outbound connections from the appliance proxy component 712, and then triggers the appliance proxy component 712 to initiate an outbound connection to the TN proxy component 762.

The secure connection establishment process 800 involves four (4) components, including two (2) that represents parts of the cloud gateway 342 and includes an edge layer 802 and a public cloud manager (PCM) 804; a cloud service manager (CSM) 806 that represents the cloud service manager 312; and the appliance proxy component (appliance proxy) 808, which is a part of the NSX manager 314 and represents the appliance proxy component 712. In one aspect of the present disclosure, the public cloud manager 804 may be implemented as a process that runs on the cloud gateway 342.

At step 810, the cloud service manager 806 deploys the cloud gateway 342 in a VM at a public cloud service environment such as one provided by AWS or Azure. The cloud service manager 806 also establishes a secure connection with the public cloud manager 804 running on the cloud gateway 342.

At step 812, the cloud service manager 806 issues a fetch cluster nodes API command to the appliance proxy component 808 to retrieve security information for the appliance proxy component 808. In one aspect of the present disclosure, the security information includes an SSL certificate for authenticating the appliance proxy component 808. The security information allows another entity such as the transport node proxy component 762 to authenticate the appliance proxy component 808. A response 720 from the appliance proxy component 808 includes the security information.

At step 822, once the security information has been retrieved, it will be incorporated into the cloud gateway 342 so when the VM on which the cloud gateway 342 is hosted is being launched, the completed certificate is calculated and programmed into the cloud gateway 342.

The public cloud manager 804 may be implemented as a component inside the cloud gateway 342 that calls internal API's on the public cloud gateway, At step 830, once the cloud gateway 342 receives the security information and other details for the appliance proxy component, such as information necessary to authenticate the appliance proxy component 808, the cloud gateway 342 will be ready to accept outbound connections from an entity such as the appliance proxy component 808. Previously, there was a requirement for an inbound port to be opened, but the present invention avoids having to weaken firewall security by not requiring the opening of a custom port for accepting inbound connections for this application.

At step 840, cloud service manager 806 will request information necessary for transport node creation from the public cloud manager 804. In one aspect of the present disclosure, the requested information includes information regarding the message client, system, and transport node. Specifically, the requested information includes details of any virtual network interfaces (VNIC) used in the CGW/TN appliance 752 such as an ID, an IP address, and other VNIC details. Information about the messaging client includes an ID, port, and cluster information. In general, the appliance proxy component will make a call through the cloud service manager 806, once the cloud gateway 342 is ready to accept outbound connections, to obtain additional information from the cloud gateway 342. In one aspect of the present disclosure, the call is directed to the public cloud manager 804 of the cloud gateway 342.

At step 842, the public cloud manager 804 will obtain details for the TN proxy component 762 for transport node creation. In one aspect of the present disclosure, the public cloud manager 804, being a component of the cloud gateway 342, may make internal API calls on the cloud gateway 342.

At step 850, security information for the TN proxy component 762 will be provided so that the security information may be passed back to the appliance proxy component.

At step 852, the cloud service manager 806 will request creation of the TN with the appliance proxy component 808. In one aspect of the present disclosure, security information for the TN proxy component may be provided to the appliance proxy component 808 along with the request. Once these details are transferred back to the appliance proxy component, both the public cloud manager 804 and the appliance proxy component will be able to authenticate each other.

At step 854, based on creation of the transport node at step 852, channel establishment between the appliance proxy component 808 and the TN proxy component 762 will be triggered. As discussed above, because both the appliance proxy component 808 and the TN proxy component 762 have security information (e.g., security certificates) for each other, the channel can be established.

At step 856, the cloud service manager 806 may check and determine if the channel establishment process has been successful by sending a query to the appliance proxy component 808. In one aspect of the present disclosure, channel establishment may be determined to be successful if it can be determined that the appliance proxy component 808 and the TN proxy component 762 are up and running.

At step 860, the cloud service manager 806 will trigger onboarding of the cloud gateway 342 to be recognized as a transport node, which is a host prepared for network virtualization platform.

Figure 9:
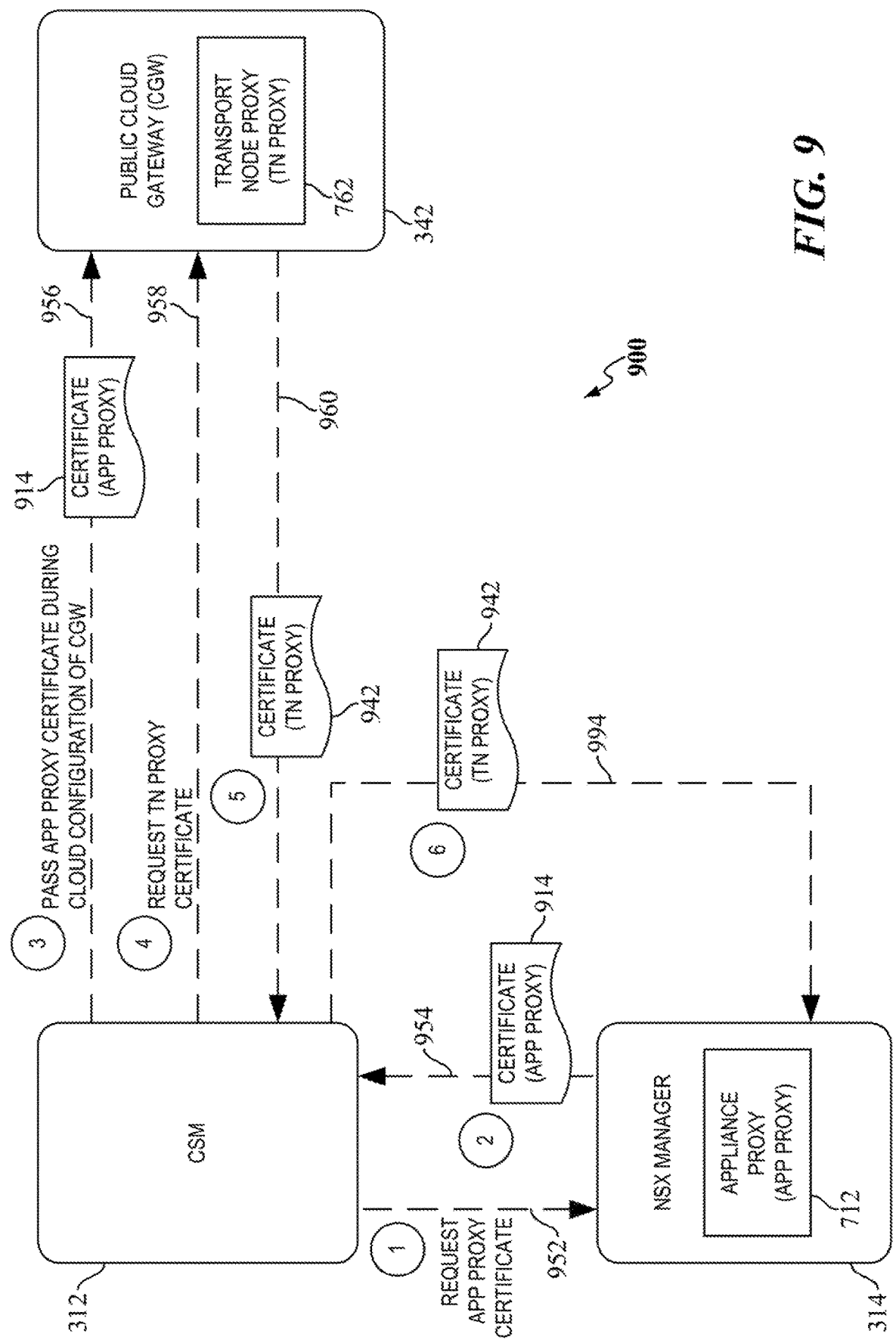
FIG. 9 is a block diagram of a security information transfer process in the method and apparatus for secure hybrid cloud connectivity configured in accordance with various aspects of the invention.

FIG. 9 illustrates a security information transfer process 900. Specifically, the figure details how the security information transfer process 900 provides for a transfer of security certificates between the cloud service manager 806, the NSX manager 314, and the cloud gateway 342. Specifically, the security information transfer process 900 details how security certificates for the appliance proxy component 712 and the TN proxy component 762 are exchanged.

At step 952, the cloud service manager 806 first requests security information for the appliance proxy component 712 from the NSX manager 314. In one aspect of the present disclosure, the security information that is requested includes a certificate of the appliance proxy component 712, referred to and illustrated as an appliance proxy component certificate 914.

At step 954, the appliance proxy component certificate 914 is provided by the NSX manager 314 to the cloud service manager 806.

At step 956, the appliance proxy component certificate 914 is provided to the cloud gateway 342. In one aspect of the present disclosure, the appliance proxy component certificate 914 is provided to the cloud gateway 342 as a part of the information necessary for configuration and initialization of the cloud gateway 342.

At step 958, the cloud service manager 806 requests security information for the cloud gateway 342 once the cloud gateway 342 is up and running. Specifically, the cloud service manager 806 requests security information for the TN proxy component 762 from the VM that is launched to host the cloud gateway 342. In one aspect of the present disclosure, the cloud service manager 806 requests a security certificate 942 for the TN proxy component 762.

At step 960, the security certificate 942 is provided by the cloud gateway 342 to the cloud service manager 806.

At step 962, the cloud service manager 806 forwards the security information for the cloud gateway 342 to the NSX manager 314.

Once the respective security information has reached both the appliance proxy component and the TN proxy component 762, then both the appliance proxy component 712 and the TN proxy component 762 may authenticate each other in that either entity may confirm the identity of the other. Specifically, if the appliance proxy component 712 is trying to reach the TN proxy component 762, the appliance proxy component 712 will already possess information such as either the domain or IP that is associated with the TN proxy component 762 because the cloud service manager 806 has launched the cloud gateway 342 in which the TN proxy component 762 is located.

In accordance with various aspects of the disclosure, various components at the customer data center (on-prem side) 310 from FIG. 3 may be implemented in the private cloud computing environment 102. For example, the cloud service manager 312, the NSX manager 314, and the NSX controller 316 may be implemented using one or more of the virtual computing instances 108A. In addition, the public cloud gateway 342 may be implemented using one of the virtual computing instances 108B in the public cloud computing environment 104. Further, the functionality of the MP/CCP unified controller appliance 702 from FIG. 7 may be implemented using one or more of the virtual computing instances 108A, while functionality of the CGW/TN appliance 752 may be implemented using one or more of the virtual computing instances 108B.

Figure 10:
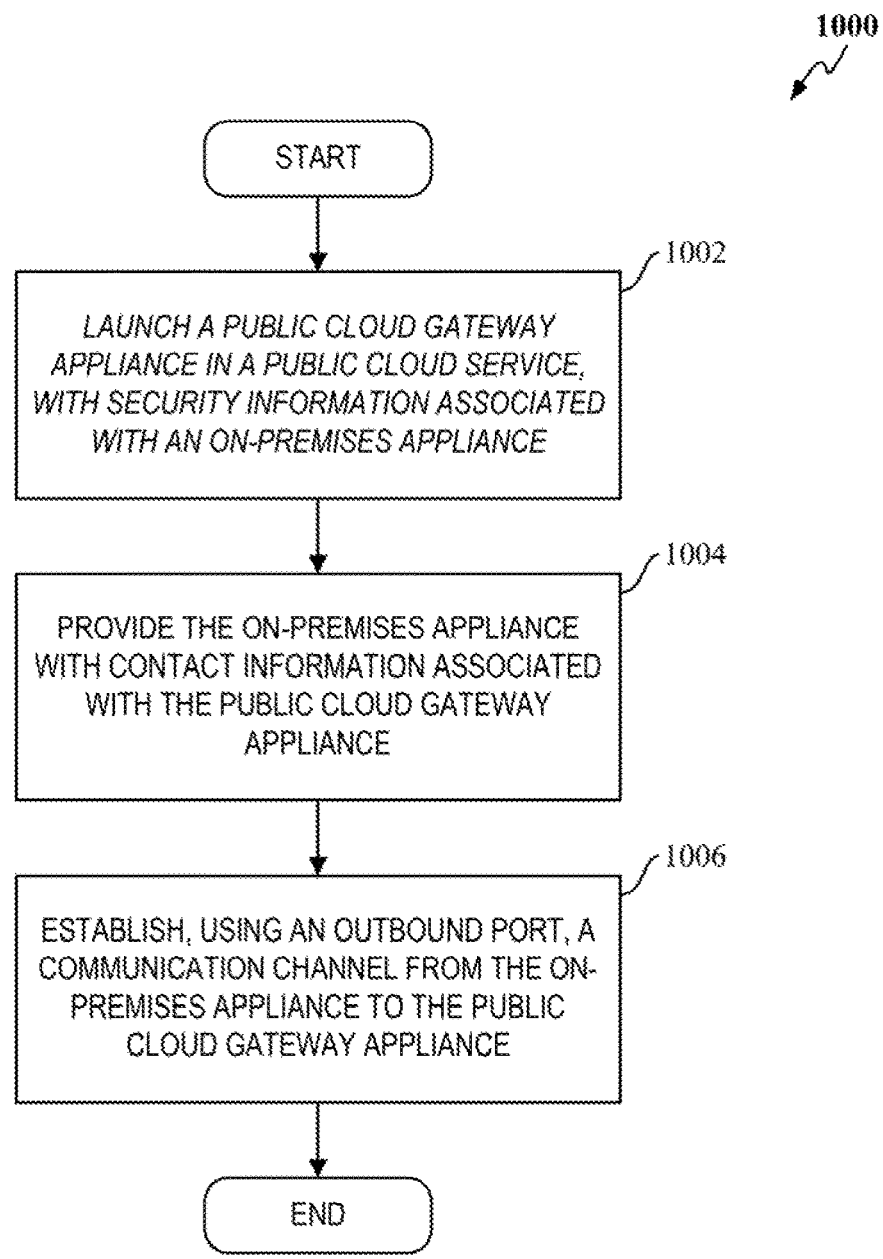
FIG. 10 is a flow diagram of a computer-implemented method, configured in accordance with various aspects of the invention, that may be used in the method and apparatus for secure hybrid cloud connectivity.

A computer-implemented method for secure hybrid cloud connectivity between an application in a public cloud service and an on-premises service supported by an on-premises appliance in accordance with various aspects of the invention is described with reference to a flow diagram 1000 of FIG. 10. At step 1002, a public cloud gateway appliance is launched in the public cloud service, the public cloud gateway appliance configured with security information associated with the on-premises appliance. At step 1004, the on-premises appliance is provided with contact information associated with the public cloud gateway appliance. At step 1006, using an outbound port, a communication channel is established from the on-premises appliance to the public cloud gateway appliance.

Although the operations of the approaches herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for secure hybrid cloud connectivity between an application in a public cloud service and an on-premises service supported by an on-premises appliance without modifying a configuration of an on-premises firewall, wherein access to the on-premises appliance is restricted via the on-premises firewall, the method comprising:

launching a public cloud gateway appliance in the public cloud service, the public cloud gateway appliance configured with security information associated with the on-premises appliance;

providing the on-premises appliance with contact information associated with the public cloud gateway appliance; and establishing, by the on-premises appliance using an outbound port of the on-premises appliance, a communication channel from the on-premises appliance to the public cloud gateway appliance, wherein the contact information associated with the public cloud gateway appliance is used by the on-premises appliance to locate the public cloud gateway for establishing the communication channel, the communication channel secured based on the security information associated with the on-premises appliance, and the communication channel provides inbound connectivity for the application in the public cloud service to the on-premises service through the on-premises firewall, wherein no inbound connection is initiated by the public cloud gateway appliance to the on-premises service through the on-premises firewall.

2. The method of claim 1, further comprising:
receiving an API command from the application in the public cloud service at the on-premises service over the communication channel, wherein the API command comprises a command to manage one or more virtual computing devices.

3. The method of claim 1, further comprising:
monitoring a connection status of the communication channel;
after establishing the communication channel, detecting a connectivity loss of the communication channel; and
reestablishing the communication channel initiated from the on-premises appliance to the public cloud gateway appliance based on the connection status.

4. The method of claim 1, wherein the public cloud gateway appliance, after being launched in the public cloud service, enters into a listening mode to await a connection request without initiating an outbound connection to the on-premises appliance.

5. The method of claim 1, wherein the security information associated with the on-premises appliance comprises a security certificate for the on-premises appliance.

6. The method of claim 1, wherein the contact information associated with the public cloud gateway appliance comprises security information for authenticating the public cloud gateway appliance.

7. The method of claim 1, wherein the security information associated with the on-premises appliance comprises information necessary to authenticate the on-premises appliance.

8. A non-transitory computer-readable storage medium containing program instructions for secure hybrid cloud connectivity between an application in a public cloud service and an on-premises service supported by an on-premises appliance without modifying a configuration of an on-premises firewall, wherein access to the on-premises appliance is restricted via the on-premises firewall, wherein execution of the program instructions by one or more processors causes the one or more processors to perform steps comprising:
  launching a public cloud gateway appliance in the public cloud service, the public cloud gateway appliance configured with security information associated with the on-premises appliance;
  providing the on-premises appliance with contact information associated with the public cloud gateway appliance; and
  establishing, by the on-premises appliance using an outbound port of the on-premises appliance, a communication channel from the on-premises appliance to the public cloud gateway appliance, wherein
    the contact information associated with the public cloud gateway appliance is used by the on-premises appliance to locate the public cloud gateway for establishing the communication channel,
    the communication channel is secured based on the security information associated with the on-premises appliance, and
    the communication channel provides inbound connectivity for the application in the public cloud service to the on-premises service through the on-premises firewall,
    wherein no inbound connection is initiated by the public cloud gateway appliance to the on-premises service through the on-premises firewall.

9. The computer-readable storage medium of claim 8, wherein execution of the program instructions by the one or more processors causes the one or more processors to further perform steps comprising:
  receiving an API command from the application in the public cloud service at the on-premises service over the communication channel, wherein the API command comprises a command to manage one or more virtual computing devices.

10. The computer-readable storage medium of claim 8, wherein execution of the program instructions by the one or more processors causes the one or more processors to further perform steps comprising:
  monitoring a connection status of the communication channel;
  after establishing the communication channel, detecting a connectivity loss of the communication channel; and
  reestablishing the communication channel initiated from the on-premises appliance to the public cloud gateway appliance based on the connection status.

11. The computer-readable storage medium of claim 8, wherein the public cloud gateway appliance, after being launched in the public cloud service, enters into a listening mode to await a connection request without initiating an outbound connection to the on-premises appliance.

12. The computer-readable storage medium of claim 8, wherein the security information associated with the on-premises appliance comprises a security certificate for the on-premises appliance.

13. The computer-readable storage medium of claim 8, wherein the contact information associated with the public cloud gateway appliance comprises security information for authenticating the public cloud gateway appliance.

14. The computer-readable storage medium of claim 8, wherein the security information associated with the on-premises appliance comprises information necessary to authenticate the on-premises appliance.

15. A system in a cloud architecture for secure hybrid cloud connectivity between an application in a public cloud service and an on-premises service supported by an on-premises appliance without modifying a configuration of an on-premises firewall, wherein access to the on-premises appliance is restricted via the on-premises firewall, the system comprising:
  memory; and
  one or more processors configured to:
    launch a public cloud gateway appliance in the public cloud service, the public cloud gateway appliance configured with security information associated with the on-premises appliance;
    provide the on-premises appliance with contact information associated with the public cloud gateway appliance; and
    establish, by the on-premises appliance using an outbound port of the on-premises appliance, a communication channel from the on-premises appliance to the public cloud gateway appliance, wherein
      the contact information associated with the public cloud gateway appliance is used by the on-premises appliance to locate the public cloud gateway for establishing the communication channel,
      the communication channel is secured based on the security information associated with the on-premises appliance, and
      the communication channel provides inbound connectivity for the application in the public cloud service to the on-premises service through the on-premises firewall,
      wherein no inbound connection is initiated by the public cloud gateway appliance to the on-premises service through the on-premises firewall.

16. The system of claim 15, wherein the one or more processors are further configured to:
  receive an API command from the application in the public cloud service at the on-premises service over the communication channel, wherein the API command comprises a command to manage one or more virtual computing devices.

17. The system of claim 15, wherein the one or more processors are further configured to cause the public cloud gateway appliance, after being launched in the public cloud service, to enter into a listening mode to await a connection request without initiating an outbound connection to the on-premises appliance.

18. The system of claim 15, wherein the security information associated with the on-premises appliance comprises a security certificate for the on-premises appliance.

19. The system of claim 15, wherein the contact information associated with the public cloud gateway appliance comprises security information for authenticating the public cloud gateway appliance.

20. The system of claim 15, wherein the security information associated with the on-premises appliance comprises information necessary to authenticate the on-premises appliance.

\* \* \* \* \*